Dec. 31, 1929.  K. E. LYMAN ET AL  1,741,577

BRAKE

Filed Jan. 8, 1927

INVENTOR
KENNETH E. LYMAN
MONTGOMERY W. McCONKEY
BY
*m.w.McConkey*
ATTORNEY

Patented Dec. 31, 1929

1,741,577

UNITED STATES PATENT OFFICE

KENNETH E. LYMAN AND MONTGOMERY W. McCONKEY, OF CHICAGO, ILLINOIS, ASSIGNORS TO BENDIX BRAKE COMPANY, OF CHICAGO, ILLINOIS, A CORPORATION OF ILLINOIS

BRAKE

Application filed January 8, 1927. Serial No. 159,793.

This invention relates to brakes, and is illustrated as embodied in an internal expanding automobile brake. An object of the invention is to provide improved means for automatically compensating for wear of the brake, preferably by adjusting the means for taking the braking torque.

In one desirable arrangement, the anchor or torque-taking means is adjusted, to compensate for the wear, by the application and release of the brake. This arrangement is illustrated in the drawing as embodied in a brake of the type in which the friction device anchors at one end when the drum is turning in one direction and at the other end when the drum is turning in the other direction, thus being fully effective in either direction of drum rotation. When embodied in a brake of this type, there are preferably two anchoring devices for the ends of the friction device and, while it is within the broad scope of the present invention to adjust any one of these three devices to compensate for the wear, we prefer to arrange the adjusting means to act on one of the anchoring devices.

Other features of novelty relate to a novel pawl-and-ratchet means for making the adjustment, and to other novel combinations of parts and desirable particular constructions which will be apparent from the following description of one illustrative embodiment shown in the accompanying drawing, in which.

Figure 1:
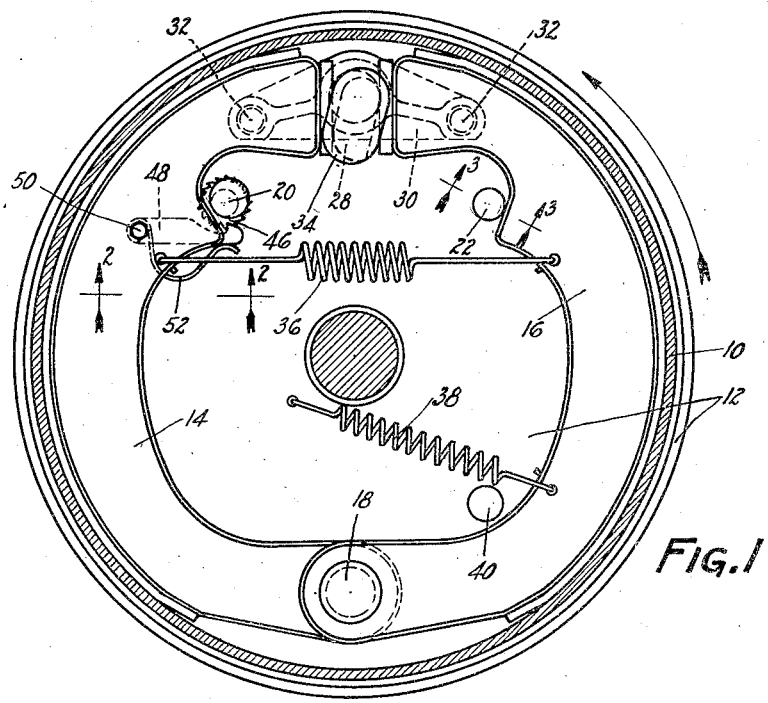
Figure 1 is a vertical section through the brake just inside the head of the brake drum, showing the brake shoes in side elevation.
Figure 2:
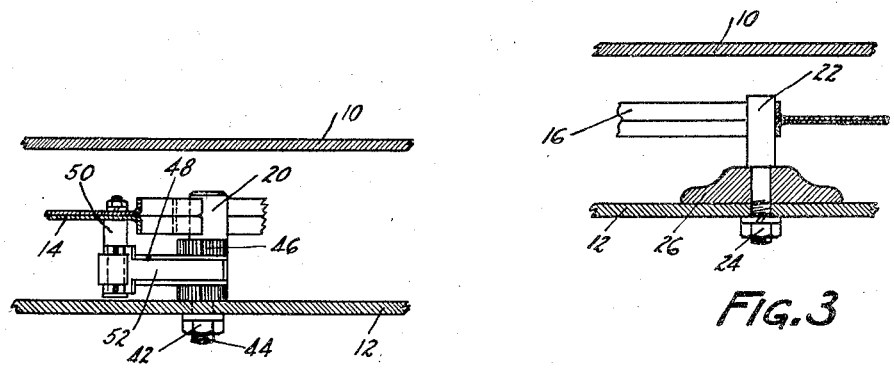
Figure 2 is a partial section on the line 2—2 of Figure 1, showing the adjustable anchor.
Figure 3:
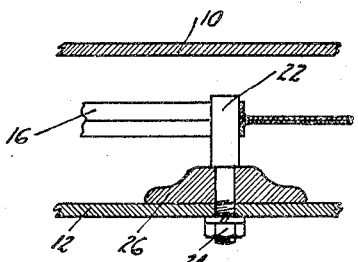
Figure 3 is a partial section on the line 3—3 of Figure 1, showing the fixed anchor.

The illustrated brake includes a rotatable drum 10, at the open side of which is a support such as a backing plate 12, and within which is arranged a floating friction device, shown as comprising two arcuate shoes 14 and 16 connected by a floating pivot 18.

When the drum is turning clockwise at the time the brake is applied, the friction device anchors against a novel stop or anchoring device 20, while if the drum is turning counter-clockwise it anchors against a fixed stop or anchoring device 22 secured by a nut 24 to backing plate 12, and preferably provided with a reinforcing plate 26 to guard against bending of the backing plate. It will be seen that anchors 20 and 22 constitute the torque-taking means of the brake.

The brake is applied by means such as a cam 28 on a shaft journalled in a bracket 30, which is secured to backing plate 12 by bolts 32 passing through slots in the backing plate 12, so that the cam 28 may shift to center or balance itself with respect to shoes 14 and 16. Cam 28 is shown with an end flange 34 laterally confining the ends of shoes 14 and 16.

The cam applies the brake against the resistance of a return spring 36, and in the normal or counter-clockwise direction of drum rotation (i. e. the direction the drum turns when the vehicle is moving forward) shoe 14 turns with the drum to apply shoe 16 against the resistance of an auxiliary spring 38 urging shoe 16 against a fixed stop 40 carried by the backing plate. Cam 28 is preferably a one-lobed cam, the side next shoe 16 being cylindrical, so that in the forward or counter-clockwise direction of drum rotation the shoe 16 remains constantly in engagement with the anchor or stop 22, although when the drum is turning in the reverse or clockwise direction the various parts including cam 28 may shift to permit shoe 14 to anchor at 20.

Anchoring device 20 is shown frictionally clamped to backing plate 12 by means such as a nut 42, the anchoring part being eccentric with respect to the pivot part 44 projecting through the backing plate. A ratchet 46, preferably integral with anchor 20 and pivot part 44, and coaxial with respect to part 44, is formed with teeth arranged to be engaged by a pawl 48 pivoted at 50 to shoe 14 and held by a leaf spring 52 against the ratchet.

In operation, when the brake is applied, if the brake-lining is worn sufficiently for pawl 48 to engage the next tooth of ratchet 46, the ratchet will turn eccentric 20 slightly, to compensate for such wear, so that the shoe 14, on the release of the brake, will have a substantially constant clearance with respect to the brake drum 10, regardless of the wear of the brake lining.

While one illustrative embodiment has been described in detail, it is not our intention to limit the scope of the invention to that particular embodiment, or otherwise than by the terms of the appended claims.

We claim:

1. A brake comprising, in combination, a drum, a friction device engageable with the drum and anchoring at one end when the drum is turning in one direction and at the other end when the drum is turning in the other direction, means for taking the braking torque from said device in either direction of rotation of the drum, and means for automatically adjusting the torque-taking means to compensate for wear of the friction device.

2. A brake comprising, in combination, a drum, a friction device engageable with the drum and anchoring at one end when the drum is turning in one direction and at the other end when the drum is turning in the other direction, a device for taking the braking torque from said friction device in each direction of rotation of the drum, and means for automatically adjusting one of said devices to compensate for wear of the friction device.

3. A brake comprising, in combination, a drum, a friction device anchoring at one end when the drum is turning in one direction and at the other end when the drum is turning in the other direction, and adjusting means operated automatically at least in one direction of rotation of the drum to compensate for wear of the friction device.

4. A brake comprising, in combination, a drum, a friction device anchoring at one end when the drum is turning in one direction and at the other end when the drum is turning in the other direction, and adjusting means operated automatically in one direction of rotation of the drum only to compensate for wear of the friction device.

5. A brake having friction means and an eccentric adjustable torque-taking device therefor, in combination with means operated automatically by the application and release of the brake to adjust the eccentric device to compensate for wear of the friction means.

6. A brake comprising, in combination, a drum, a friction device movable to engage the drum, a torque-taking device for said friction device, and pawl-and-ratchet parts carried respectively by the friction and torque-taking devices and relatively operated by the brake-applying and releasing movement of the friction dvice to adjust the torque-taking device to compensate for wear of the friction device.

7. A brake comprising, in combination, a drum, a friction device movable to engage the drum, a torque-taking device for said friction device, and parts carried respectively by the friction and torque-taking devices and relatively operated by the brake-applying and releasing movement of the friction device to adjust one of said devices with respect to the other to compensate for wear of the friction device.

8. A brake comprising, in combination, a drum, a floating friction device, an anchor device adjacent each end of the friction device arranged to take the torque in one direction or the other of drum rotation and to position the friction device when the brake is released, and means for automatically adjusting one of said devices to compensate for wear of the friction device and preserve a predetermined clearance of the friction device with respect to the drum when the brake is released.

9. A brake comprising, in combination, a drum, a floating friction device, an anchor device adjacent each end of the friction device arranged to take the torque in one direction or the other of drum rotation and to position the friction device when the brake is released, and means for automatically adjusting one of the anchor devices to compensate for wear of the friction device and preserve a predetermined clearance of the friction device with respect to the drum when the brake is released.

10. An adjustable positioning stop for a brake comprising, in combination, a frictionally-clamped pivot, an eccentric stop turning with said pivot, a ratchet moving with the pivot, and an automatically-operated pawl engaging the ratchet to turn the eccentric.

11. An adjustable positioning device for a brake comprising, in combination, an eccentric having a ratchet turning therewith, and an automatically-operated pawl engaging the ratchet to turn the eccentric.

In testimony whereof, we have hereunto signed our names.

KENNETH E. LYMAN.
MONTGOMERY W. McCONKEY.